United States Patent [19]
Weder et al.

[11] Patent Number: 5,208,027
[45] Date of Patent: * May 4, 1993

[54] ARTICLE FORMING SYSTEM

[75] Inventors: Donald E. Weder; E. H. Weder, both of Highland, Ill.; R. E. Jack Dunn, St. Louis; Franklin J. Craig, Valley Park, both of Mo.

[73] Assignee: Highland Supply Corporation, Highland, Ill.

[ * ] Notice: The portion of the term of this patent subsequent to Jan. 30, 2007 has been disclaimed.

[21] Appl. No.: 464,694

[22] Filed: Jan. 16, 1990

Related U.S. Application Data

[63] Continuation of Ser. No. 219,083, Jul. 13, 1988, Pat. No. 4,897,031, which is a continuation of Ser. No. 4,274, Jan. 5, 1987, Pat. No. 4,773,182, which is a continuation of Ser. No. 613,080, May 22, 1984, abandoned.

[51] Int. Cl.⁵ .................... B29C 51/20; B29C 51/26; B29C 51/10; B29C 51/38
[52] U.S. Cl. .................... 425/388; 425/126.1; 425/400; 425/437; 425/387.1
[58] Field of Search ............ 425/126.1, 383, DIG. 48, 425/400, 406, 289, 361, 436 R, 437, 387.1, 397, 398, 388, 122

[56] References Cited

U.S. PATENT DOCUMENTS

| Re. 32,129 | 4/1986 | Aoki | 425/525 |
|---|---|---|---|
| D. 254,659 | 4/1980 | Karotseris | D11/2 |
| 557,526 | 3/1896 | Egge | 156/212 |
| 643,235 | 2/1900 | Rogers et al. | 425/398 |
| 891,642 | 6/1908 | Tietzmann | 493/154 |
| 1,069,675 | 8/1913 | Claussen | 229/153 |
| 1,446,563 | 2/1923 | Hughes | 47/72 |
| 1,868,853 | 7/1932 | Sievers | 47/66 |
| 2,204,664 | 6/1940 | Clark | 156/76 |
| 2,302,259 | 11/1942 | Rothfuss | 229/8 |
| 2,355,559 | 8/1944 | Renner | 229/8 |
| 2,482,981 | 9/1949 | Kamrass | 47/41.14 |
| 2,622,380 | 12/1952 | Snyder | 53/464 |
| 2,651,809 | 9/1953 | Mechur et al. | 425/340 |
| 2,691,188 | 10/1954 | Goodfellow | 425/394 |
| 2,691,798 | 10/1954 | Winchester et al. | 425/384 |
| 2,780,401 | 2/1957 | Stevens | 229/2.5 R |
| 2,967,652 | 1/1961 | Canfield et al. | 229/5.5 |
| 3,022,605 | 2/1962 | Reynolds | 47/58 |
| 3,189,502 | 6/1965 | Little | 156/210 |

(List continued on next page.)

FOREIGN PATENT DOCUMENTS 3207565 9/1983 Fed. Rep. of Germany .
560532 4/1975 Switzerland .

Primary Examiner—Willard Hoag
Attorney, Agent, or Firm—Dunlap, Codding & Lee

[57] ABSTRACT

An article forming system for forming at least one sheet of material into an article, such as a decorative flower pot cover for example, and a novel article formed utilizing such a system. The article forming system includes a male die, a female die and a platform having a support surface and an opening extending through the support surface. The female die is disposed generally within the opening in the platform with the upper end of the female die being disposed near the support surface. The article forming system includes means for slidingly holding portions of the sheet of material generally against portions of the support surface while permitting such held portions to slide on the support surface during the forming of the article for cooperating in forming a decorative border on the decorative flower pot cover type of article which flares generally away from the flower pot object when the decorative flower pot cover article is applied to the flower pot. The article formed in accordance with the present invention includes overlapping folds formed by overlapping portions of the sheet of material to bring portions of the sheet of material into bondable contact, the overlapping folds providing the mechanical strength necessary for the formed sheet of material to hold a predetermined shape.

4 Claims, 4 Drawing Sheets

OTHER PUBLICATIONS

| | | | |
|---|---|---|---|
| 3,258,813 | 7/1966 | Groth et al. | 425/388 |
| 3,271,922 | 9/1966 | Wallerstein et al. | 53/399 |
| 3,318,748 | 5/1967 | Hurst | 156/224 |
| 3,329,306 | 7/1967 | Stein | 264/334 |
| 3,334,379 | 8/1967 | Settembrini | 425/540 |
| 3,341,895 | 9/1969 | Shelby | 425/397 |
| 3,466,214 | 9/1969 | Polk et al. | 156/213 |
| 3,488,022 | 1/1970 | Vittori | 248/152 |
| 3,527,854 | 9/1970 | Martin et al. | 425/388 |
| 3,542,616 | 11/1970 | Cain et al. | 156/224 |
| 3,584,109 | 6/1971 | Meadors et al. | 264/292 |
| 3,632,272 | 1/1972 | Herbener | 425/388 |
| 3,687,594 | 8/1972 | Medendorp | 425/388 |
| 3,775,932 | 12/1973 | Jeney | 53/433 |
| 3,791,902 | 2/1974 | Hanke et al. | 156/212 |
| 3,933,562 | 1/1976 | Cruckshank et al. | 156/250 |
| 3,943,215 | 3/1976 | Grüne et al. | 425/388 |
| 3,962,503 | 6/1976 | Crawford | 428/40 |
| 4,043,077 | 8/1977 | Stonehocker | 47/66 |
| 4,118,890 | 10/1978 | Shore | 47/28.1 |
| 4,170,618 | 10/1979 | Adams | 264/101 |
| 4,216,620 | 8/1980 | Weder et al. | 47/72 |
| 4,239,472 | 12/1980 | Atkinson et al. | 425/388 |
| 4,300,312 | 11/1981 | Weder et al. | 47/72 |
| 4,379,101 | 4/1983 | Smith | 264/101 |
| 4,388,356 | 6/1983 | Hrivak et al. | 264/549 |
| 4,423,000 | 12/1983 | Teraoka | 264/524 |
| 4,508,223 | 4/1985 | Catrambone | 206/423 |
| 4,744,742 | 5/1988 | Aoki | 425/126.1 |

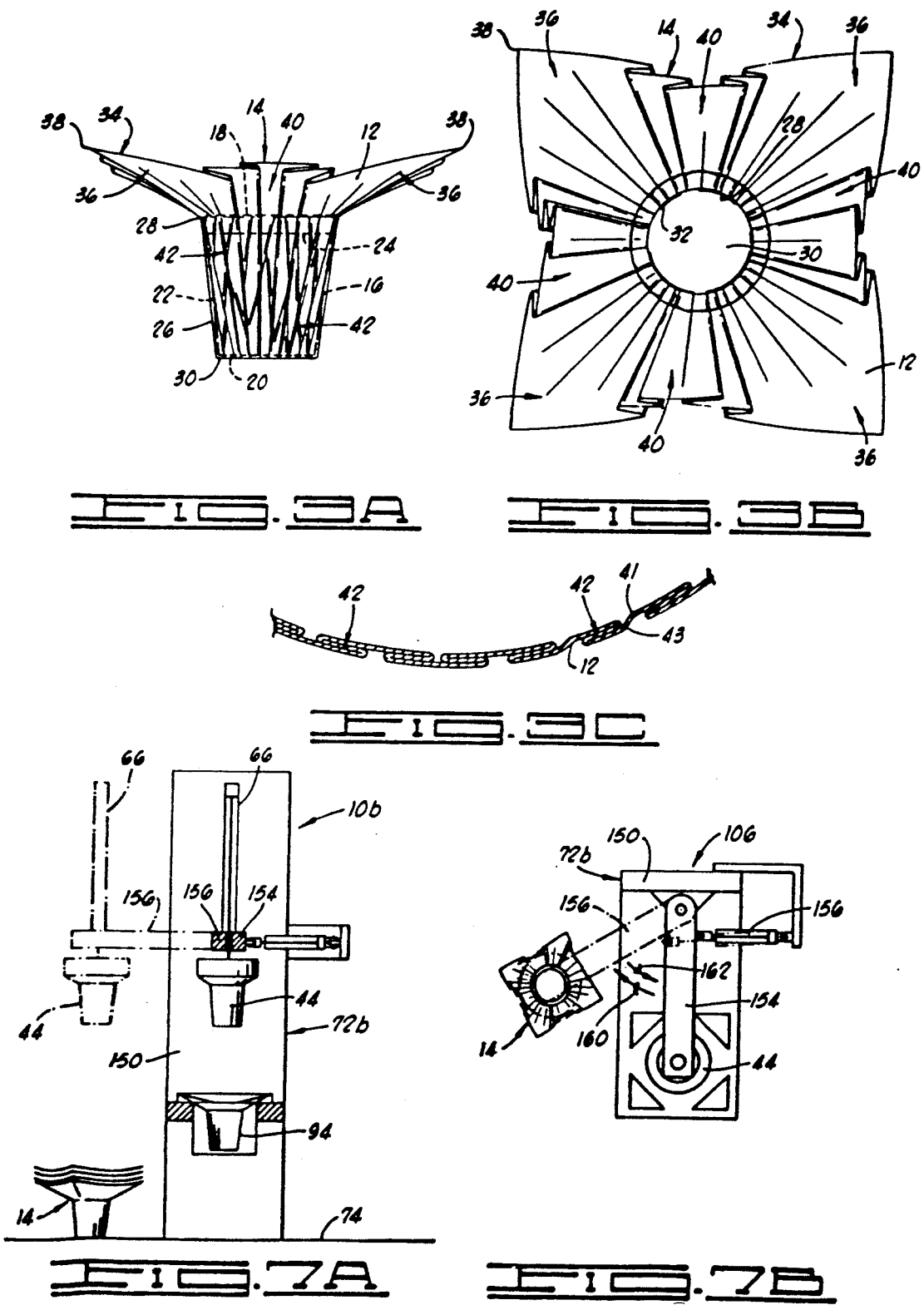

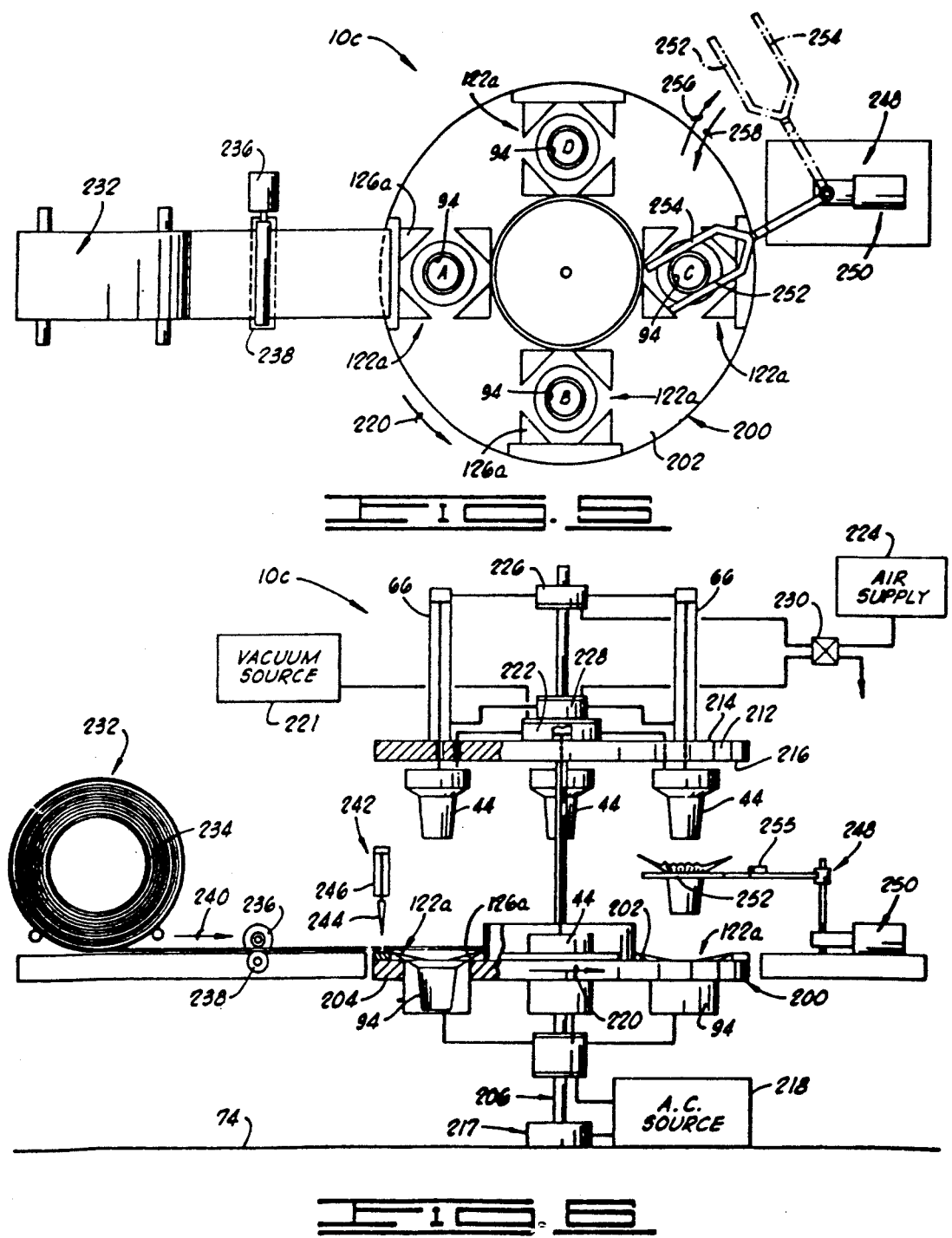

ARTICLE FORMING SYSTEM

CROSS-REFERENCE TO RELATED APPLICATIONS

This application is a continuation of U.S. Ser. No. 219,083, filed Jul. 13, 1988, entitled "ARTICLE FORMING SYSTEM", now U.S. Pat. No. 4,897,031, which is a continuation of U.S. Ser. No. 004,274, filed Jan. 5, 1987, entitled "ARTICLE FORMING SYSTEM", now U.S. Pat. No. 4,773,182 which is a continuation of U.S. Ser. No. 613,080, filed May 22, 1984, entitled "ARTICLE FORMING SYSTEM", now abandoned.

BACKGROUND OF THE INVENTION

Field of the Invention

The present invention relates generally to an article forming system and an article formed using such article forming system and, more particularly, but not by way of limitation, to an article like a decorative flower pot cover and an article forming system for forming such a decorative flower pot cover article.

BRIEF DESCRIPTION OF THE DRAWINGS

FIG. 3A is a side elevational view of a flower pot cover article formed using the article forming system of FIGS. 1 and 2, and also showing a portion of a flower pot object (shown in dashed lines) with the flower pot cover article being operatively disposed on such flower pot object.

FIG. 3B is a top plan view of the flower pot cover article of FIG. 3A.

FIG. 3C is a sectional view of a portion of the base of the flower pot cover article of FIG. 3A and 3B showing some of the overlapping folds.

FIG. 5 is a plan view showing an automatic article forming system utilizing four article forming apparatus.

FIG. 6 is a side elevational, partial sectional view of the article forming system shown in FIG. 5.

FIG. 7A is a front elevational, partial sectional view of another modified article forming system which is constructed like the article forming system of FIGS. 1 and 2, except the article forming system shown in FIG. 7A includes a modified support.

FIG. 7B is a top plan view of the article forming system of FIG. 7A.

DESCRIPTION OF THE PREFERRED EMBODIMENTS

Figure 1:
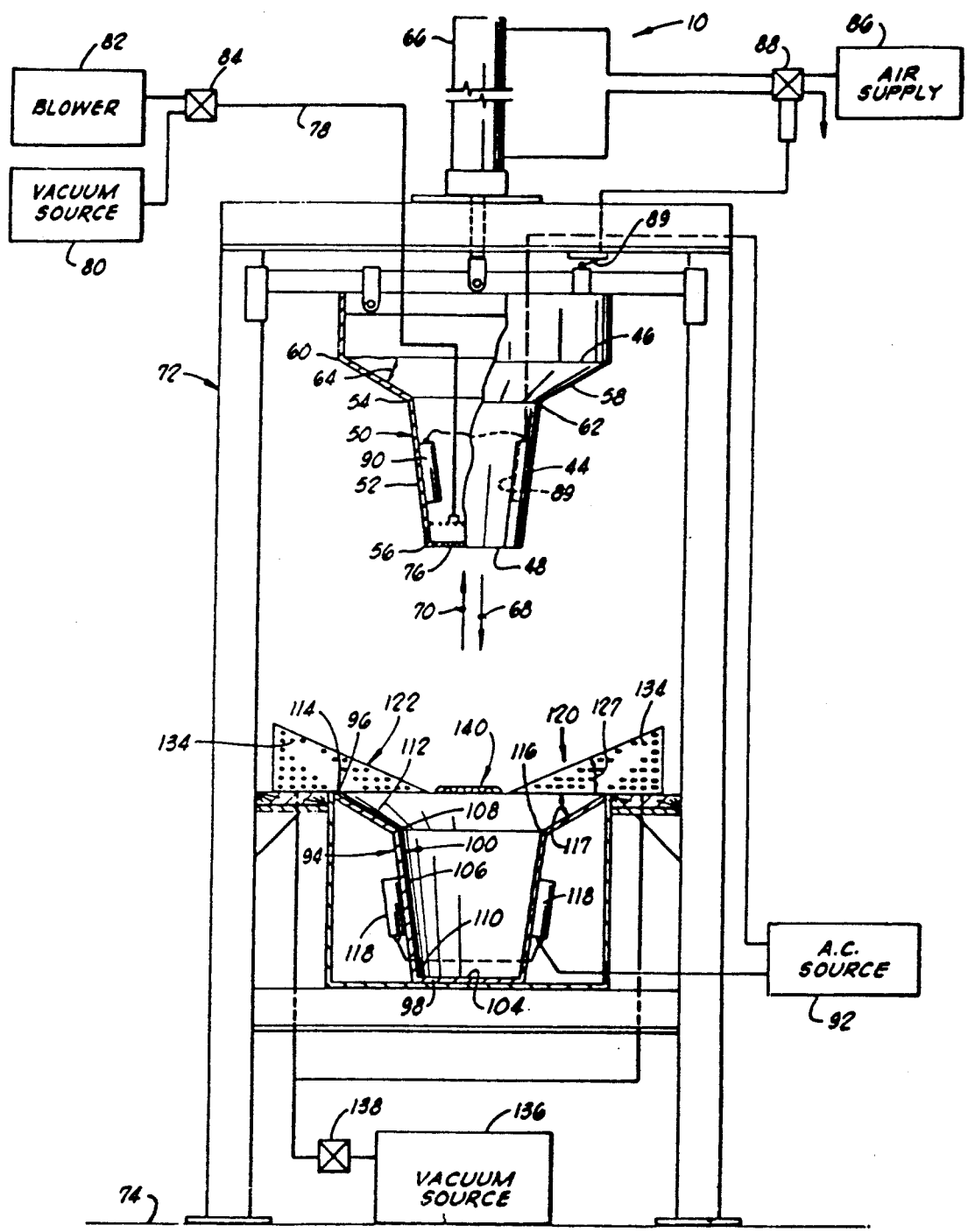
FIG. 1 is a side elevational, partial sectional, diagrammatic view of an article forming system which is constructed in accordance with the present invention.
Figure 2:
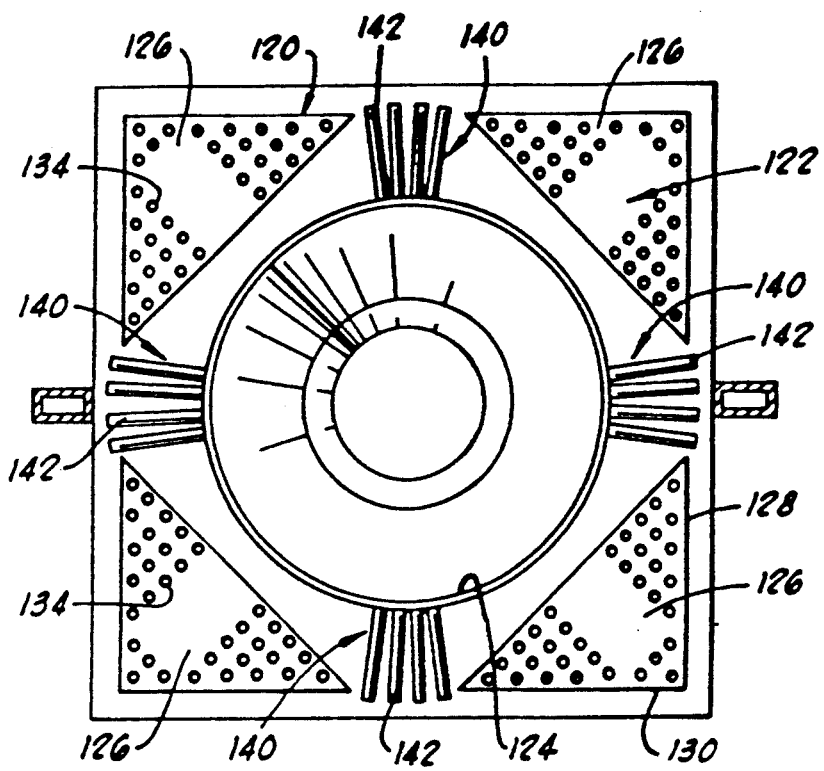
FIG. 2 is a plan view of the platform of the article forming system of FIG. 1.

Shown in FIGS. 1 and 2 is an article forming system 10 which is constructed in accordance with the present invention. The article forming system 10 is adapted to form at least one sheet of material into an article having a predetermined shape, a sheet of material 12 being shown in FIGS. 3A and 3B formed into a decorative flower pot cover article 14 for a flower pot 16, the flower pot 16 being shown in dashed lines in FIG. 3A.

It should be noted that the present invention is described herein as being adapted to form the sheet of material 12 into the predetermined shape of a decorative flower pot cover type of article since one extremely advantageous use of the system of the present invention is to form such decorative flower pot cover types of articles. However, a decorative flower pot cover represents only one article which can be formed into a predetermined shape in accordance with the present invention and the present invention specifically contemplates various and numerous other types of articles such as vases, hats, saucers, easter baskets, containers for use in microwave ovens, rose stem boxes, egg cartons, potting trays, pans, trays, bowls, basket liners, candy trays, drinking cups, candy cups, flower pots, planter trays for growing plants, disposable bowls and dishes, corsage boxes and containers, food service trays (such as those used for bakery goods, french fries, ground beef, liver and other raw meats in supermarkets, for example), boxes for hamburgers or pies and the like, and various other articles. The term "article" as used herein is intended to encompass all of the specific articles just mentioned and the term "article" also is intended to be broad enough to encompass any other article having a predetermined shape where the article to function must be capable of substantially maintaining such predetermined shape.

The present invention particularly contemplates articles being formed into a predetermined shape from a sheet of material having a relatively small thickness and being of the type commonly referred to in the art as a "film". More particularly, the sheet of material contemplated by the present invention is a processed, man-made organic polymer selected from the group consisting of polypropylene, polyvinyl chloride, or combinations thereof. The sheet of material contemplated by the present invention is relatively thin having a thickness less than about 1.5 mills and the sheet of material is very flexible and flimsy so that the sheet of material will not normally maintain or hold a predetermined formed shape under normal, usual conditions (non-shape sustaining). In some instances and for various reasons, it may be desirable to utilize more than one sheet of material and, in these instances, the sheets of material are layered, placed one on the other, when the sheets of material are formed into the predetermined shape to form the desired article; however, even in these instances, the combined thickness of the sheets of material still is less than about 3.0 mills. The present invention provides a means for forming a sheet of material of the type just described into a predetermined shape so the formed sheet of material substantially retains or maintains the formed shape thereby providing a means for making articles from such sheets of material in a more economical manner.

As shown in dashed lines in FIG. 3A, the flower pot object 16 has an upper end 18, a lower end 20 and an outer peripheral surface 22. In the embodiment of the flower pot object 16 shown in FIG. 3A, the diameter of the flower pot object 16, generally near the lower end 20, is less than the diameter of the flower pot object 16, generally near the upper end 18, the flower pot object 16 tapering outwardly generally from the lower end 20 toward the upper end 18 thereby giving the flower pot object 16 a generally overall frusto-conically shaped outer peripheral surface 22. In this embodiment, the flower pot object 16 includes a rim 24 formed at the upper end 18 which extends circumferentially about the flower pot object 16, although it should be noted that some flower pot objects do not include a rim and flower pot also have various shapes as generally well known, and the present invention is not limited to any particular shape of a flower pot.

The decorative flower pot cover article 14 preferably, although not exclusively, is formed from a generally square-shaped sheet of material 12 having four corners. As shown in FIGS. 3A and 3B, the decorative flower pot cover article 14 formed from the generally square-shaped sheet of material 12 utilizing the system 10 of the present invention includes a base 26 having an opened upper end 28, a closed lower end 30, an object opening 32 extending through the upper end 28 and a decorative border 34 which extends angularly upwardly and outwardly from the upper end 28 of the base 26. The decorative border 34 includes four accentuated and sculptured flared petal-like portions 36, each flared petal-like portion 36 terminating with a pointed end 38 which is formed by one of the four corners of the square-shaped sheet of material 12. Each flared petal portion 36 extends a distance angularly upwardly and outwardly from the upper end 28 of the base 26 terminating with the pointed end 38. The flared petal-like portions 36 are spaced apart circumferentially about the decorative border 34 with the flared petal-like portions 36 being spaced at about ninety degree intervals, and a flare connecting portion 40 is disposed between each pair of adjacent flared portions 36, the flare connecting portions 40 also each extending a distance angularly upwardly and outwardly from the upper end 28 of the base 26 which is less than the distances which the pointed ends 38 of the flared portions 36 extend from the upper end 28 of the base 26.

The object opening 32 in the decorative flower pot cover 14 is shaped and sized to receive the flower pot object 16. When the flower pot 16 is operatively disposed in the object opening 32 of the decorative flower pot cover 14, as shown in FIG. 3A, the base 26 substantially encompasses the outer peripheral surface 22 of the flower pot 16 extending generally between the upper and the lower ends 18 and 20 of the flower pot 16, with the upper end 28 of the base 26 being disposed generally near the upper end 18 of the flower pot 16 and the lower end 30 of the decorative flower pot cover 14 being disposed generally near the lower end 20 of the flower pot 16, the closed lower end 30 of the decorative flower pot cover 14 extending across and encompassing the lower end 20 of the flower pot 16. In this position with the decorative flower pot cover 14 operatively connected to the flower pot 16, the decorative border 34 of the decorative flower pot cover 14 extends a distance angularly upwardly and outwardly from the upper end 18 of the flower pot 16 and the decorative flower pot cover 14 extends generally circumferentially about the upper end 18 portion of the flower pot 16.

As shown in FIGS. 3A and 3C, the base 26 of the decorative flower pot cover 14 formed utilizing the system 10 of the present invention includes a plurality of overlapping folds 42 (only some of the overlapping folds 42 being designated by a reference numeral in the drawings). A substantial portion of the overlapping folds 42 extend at angles to a vertical direction and at angles to a horizontal direction, the various angles being arbitrary and varying from one overlapping fold 42 to another overlapping fold 42. Further, the base 26 includes a plurality of overlapping folds 42 with the various overlapping folds 42 being positioned at various positions about the entire outer peripheral surface of the base 26 and at various positions between the upper and the lower ends 28 and 30 of the base 26. The overlapping folds 42 provide an overall decorative appearance to the base 26; however, more significantly, the overlapping folds 42 provide a mechanical strength to the base 26 for enabling the base 26 to stand upright (substantially retain the shape formed by the system 10 of the present invention) on the closed lower end 30 of the base 26. In this manner, the base 26 of the decorative flower pot cover 14 has sufficient mechanical strength to stand upright about the flower pot 16 without the necessity of mechanically connecting the base 26 to the flower pot 16, other than the connection normally provided when the lower end 20 of the flower pot 16 engages the lower end 30 of the decorative flower pot cover 14 when the decorative flower pot cover 14 is operatively connected to the flower pot 16. Each overlapping fold 42 extends an arbitrary distance and most of the overlapping folds 42 extend at arbitrary angles over the base 26 which enhances the mechanical strength of the base 26 as compared to the mechanical strength which might be imparted to the base 26 by overlapping folds extending only in vertical or horizontal directions. Significantly, the overlapping folds 42 permit relatively thin sheets (films) of material to be utilized to form the decorative flower pot cover 14, in a manner and for reasons to be discussed further below.

As shown in FIG. 3C, the sheet of material 12 has an upper surface 41 and a lower surface 42 and, in accordance with the present invention, either the upper surface 41 or the lower surface 42 or both of the sheet of material 12 is adapted to be bondable so that, when portions of the bondable surface are brought into bondable contact, such portions are bondably connected. The overlapping folds 42 are formed by overlapping portions of the bondable surface and bringing such overlapping portions into bondable engagement or contact. In this manner, the overlapping folds 42 are permanently fixed in the article.

When an overlapping fold 42 is formed with a portion of the sheet of material 12 during the forming of the decorative flower pot cover 14, portions of the upper surface 41 are overlapped and brought into bondable contact or engagement and, with respect to the same overlapping fold 42, portions of the lower surface 42 also are overlapped and brought into bondable contact or engagement. As mentioned before, at least one of the upper and the lower surfaces 41 and 43 is prepared to be bondable to form a bondable surface which is adapted to be bonded to portions of a similar bondable surface when bondably contacted with a similar bondable surface portion. Thus, in those instances where only the lower surface 43 is prepared to form a bondable lower surface 43, the overlapping portions of the bondable lower surface 43 are brought into bondable contact during the forming of the decorative flower pot cover 14 and such overlapping portions are bonded to form the overlapping folds 42, and, in this instance, the corresponding overlapping portions of the upper surface 41 are not bonded. In those instances where only the upper surface 41 is prepared to form a bondable upper surface 41, the overlapping portions of the bondable upper surface 41 are brought into bondable contact during the forming of the decorative flower pot cover 14 and such overlapping portions are bonded to form the overlapping folds 42 and, in this instance, the corresponding overlapping portions of the lower surface 42 are not bonded. In those instances where both the upper and the lower surfaces 41 and 43 are prepared to form bondable upper and lower surfaces 41 and 43, the overlapping portions of the upper and the lower surfaces 41 and 43 forming each overlapping fold 42 are brought into bondable contact during the forming of the decorative flower pot cover 14 and such overlapping portions of the upper and the lower surfaces 41 and 43 are bonded to form the overlapping folds 42.

It has been found to be necessary only to prepare one of the upper and the lower surfaces 41 or 43 to form a bondable surface so the decorative flower pot 14 is formable from the film sheet of material 12 having sufficient mechanical strength to retain its formed shape in accordance with the present invention. However, it should be noted that preparing both the upper and the lower surfaces 41 and 43 to form bondable surfaces provides additional mechanical strength which may be desired in some applications and particularly in those applications where the additional mechanical strength is needed to enable the formed article to maintain or retain its formed shape, such additional strength being needed either because of the particular shape of the article or the particular thickness or characteristics of the particular film forming the sheet of material 12.

Various techniques are utilized to prepare the sheet of material 12 with at least one bondable surface in accordance with the present invention.

One technique for preparing the bondable surfaces is to utilize polyvinyl chloride film to form the sheet of material 12 which is heat sealable. When utilizing a processed organic polymer heat sealable film, the upper and the lower surfaces 41 and 43 of the sheet of material 12 are bondable surfaces and the sheet of material 12 must be heated during the forming of the article or, more particularly, the forming of overlapping folds 42. Thus, in this instance, the term "bondable contact" or "bondable engagement" means contacting engagement and the application of the required amount of heat to effect heat sealable bonding of the contacting surfaces.

It should be noted that a light activated adhesive also is suitable for use in preparing the bondable surface in accordance with the present invention. In this instance, heating elements would not be necessary; however, means for lighting the areas to be bonded would be necessary which might be effected by substituting light sources for the heating elements described herein and constructing the male and female dies of a light transparent material. In this instance, the term "bondable contact" or "bondable engagement" means contacting engagement and the applications of sufficient light to effect the bond.

One other technique for preparing the bondable surfaces is to utilize a non-heat sealable film to form the sheet of material 12 and to apply a heat sealable coating to either the upper surface 41 or the lower surface 43 or both. Heat sealable adhesives are commercially available. The term "bondable contact" or "bondable engagement" as used in this instance means contacting engagement and the application of the required amount of heat to effect heat sealable bonding of the contacting surfaces. The heat sealable coating also can be a heat sealable lacquer, a pressure sensitive adhesive which also requires heat to effect the bond, or a hot melt adhesive.

One other technique for preparing the bondable surfaces is to utilize a non-heat sealable film to form the sheet of material 12 and to apply a contact adhesive coating the either the upper surface 41 or the lower surface 43 or both. Contact adhesives are commercially available. The term "bondable contact" or "bondable engagement" in this instance means contacting engagement sufficient to effect the adhesive bond between the contacted surfaces.

For esthetic purposes, it is preferable that the decorative border 34 and particularly the flared petal-like portions 36 remain substantially smooth, substantially free of the overlapping folds. Also, it is desirable that the flare connecting portions 40 also remain substantially smooth, substantially free of the overlapping folds. The cover forming system 10 is constructed and adapted substantially to accomplish these desired characteristics of the decorative flower pot cover 14 in a manner which will be described in greater detail below.

As shown in FIG. 1, the system 10 includes a male die 44 having an upper end 46 and a lower end 48. A male die surface 50 is formed on a portion of the outer peripheral surface of the male die 44 and the male die surface 50 extends a distance generally from the lower end 48 toward the upper end 46 of the male die 44. A portion of the male die surface 50 extending from the lower end 48 a distance toward the upper end 46 of the male die 44 forms a base portion 52 of the male die surface 50, and the base portion 52 of the male die surface 50 has an outer peripheral surface which is shaped about the same as the outer peripheral surface 22 of the flower pot object 16, the dimensions of the base portion 52 being slightly larger than the comparable dimensions of the outer peripheral surface 22 of the flower pot 16, so the decorative flower pot cover 16 will fit generally about the outer peripheral surface 22 of the flower pot 16 when the decorative flower pot cover 14 is operatively connected to the flower pot 16. The base portion 52 has an upper end 54 and a lower end 56, the lower end 56 of the base portion 52 coinciding with and forming the lower end 48 of the male die 44. Thus, the base portion 52 of the male die surface 50 generally is frusto-conically shaped with the diameter of the base portion 52 generally at the lower end 56 being smaller than the diameter of the base portion 52 generally at the upper end 54 of the base portion 52. A portion of the male die surface 50 flares a distance angularly outwardly and upwardly from the upper end 54 of the base portion 52, the flared portion 58 of the male die surface 50 having an upper end 60 and a lower end 62 with the lower end 62 being connected to the upper end 54 of the base portion 52. As shown in FIG. 1, the flared portion 58 extends at an angle 64 outwardly and upwardly from the upper end 54 of the base portion 52.

A rod is reciprocatingly disposed in a hydraulic cylinder 66 and the rod of the hydraulic cylinder 66 is connected to the upper end 46 of the male die 44. The hydraulic cylinder 66 is adapted and positioned to move the male die 44 in a downward direction 68 to a forming position and to move the male die 44 in an upward direction 70 to a storage position (shown in FIG. 1). The hydraulic cylinder 66 is connected to a support assembly 72, and the hydraulic cylinder 66 and the support assembly 72 cooperate to support the male die 44 a distance above a support surface 74.

At least one and preferably a plurality of openings 76 (only one opening 76 being designated by a reference numeral in FIG. 1) extend through the male die 44, each opening 76 extending through the lower end 48 of the male die 44. One end of a conduit 78 is connected to the male die 44 and is positioned in communication with the openings 76. A vacuum source 80 is connected to the conduit 78 and a blower 82 also is connected to the conduit 78. A control valve 84 is interposed between the vacuum source 80 and conduit 78 and the control valve 84 also is interposed between the blower 82 and conduit 78. In one position of the control valve 84, communication is established between the vacuum source 80 and the openings 76 in the male die 44 and, in one other position of the control valve 84, communication is established between the blower 82 and the openings 76 in the male die 44.

An air supply 86 is connected to the hydraulic cylinder 66 and a control valve 88 is interposed between the air supply 86 and the hydraulic cylinder 66. In one position of the control valve 88, the air supply 86 is connected to the upper end of the hydraulic cylinder 66 for moving the male die 44 in the downward direction 68 and, in one other position of the control valve 88, the air supply 86 is connected to the lower end of the hydraulic cylinder 66 for moving the male die 44 in the upward direction 70.

The control valve 88 has a third position wherein communication is interrupted between the hydraulic cylinder 66 and the air supply 86 and a switch 89 is positioned on the support assembly 72 and connected to the control valve 88 for positioning the control valve 88 in this third position. More particularly, when the control valve 88 is positioned to move the male die 44 in the upward direction 68, the male die 44 is moved in the upward direction 68 and, when the male die 44 reaches the storage position, the male die 44 engages the switch 89 to position the control valve 88 in the just described third position.

A plurality of cartridge type heating elements 90 (only two elements 90 being shown in FIG. 1) are connected to the male die 44. Each of the heating elements 90 is disposed in a cylinder in an inner portion of the male die 44 and the heating elements 90 are positioned about the male die 44 to heat the male die surface 50 to a predetermined temperature level during the operation of the system 10. Each of the heating elements 90 is connected to an electrical power supply. In one form, the electrical power supply 92 also includes a switch (not shown) for conditioning the heating elements 90 in the heating mode or, in other words, for applying electrical power to the heating elements 92 in the closed position of such switch and the electrical power supply 92 also may be connected to a temperature sensing device (not shown) located on the male die 44 and positioned to sense the temperature level of the male die surface 50, the sensing device controlling the connection of the electrical power supply 92 to the heating elements 90 to maintain the temperature level of the male die surface 50 at a desired predetermined temperature level.

The system 10 also includes a female die 94 having an upper end 96 and a lower end 98. An opening is formed through the upper end 96 of the female die 94 extending a distance generally toward the lower end 98 of the female die 94, the opening forming a female die surface 100 having an upper end 102 and a lower end 104. The support assembly 72 supports the male die 44 a distance generally above the generally aligned with the female die 94. The opening forming the female die surface 100 is shaped and sized to receive and formingly mate with the male die surface 50 with a sufficient clearance therebetween to accommodate portions of the sheet of material 12 during the forming of the decorative flower pot cover 14.

The female die surface 100 includes a base portion 106 having an upper end 108 and a lower end 110. The base portion 106 generally is frusto-conically shaped and, thus, the diameter of the base portion 106 generally near the lower end 110 is smaller than the diameter of the base portion 106 generally near the upper end 108 of the base portion 106. The base portion 106 of the female die 100 is shaped to mate with the base portion 52 of the male die 44 with sufficient clearance therebetween to accommodate portions of the sheet of material 12 during the forming of the decorative cover 14.

The female die surface 100 also includes a flared portion 112 having an upper end 114 and a lower end 116, the lower end 116 of the flared portion 112 being connected to the upper end 108 of the base portion 106. The flared portion 112 extends angularly outwardly and upwardly from the upper end 108 of the base portion 106. The flared portion of the female die surface 100 is shaped to mate with the flared portion 58 of the male die 44 with sufficient clearance therebetween to accommodate portions of the sheet of material 12 during the forming of the decorative cover 14. The flared portion 112 extends at an angle 117 which is about the same as the angle 64.

A plurality of cartridge-type heating elements 118 (only two elements 118 being shown in FIG. 1) are connected to the female die 94. The heating elements 118 are positioned about the female die surface 100 and connected to the electrical power supply 92 for heating the female die surface 100 to a predetermined temperature level during the forming of the decorative cover 14 and a temperature sensing device (not shown) may be connected to the female die 94 in a manner and for reasons like that described before with respect to the heating elements 90 in the male die 44.

As shown in FIGS. 1 and 2, the system 10 includes a platform 120 having an upper support surface 122 and an opening 124 (shown in FIG. 2) formed through a control portion thereof. The female die 94 is disposed through the opening 124 to a position wherein the upper end 96 of the female die 94 is disposed generally adjacent the support surface 122. The platform 120 is connected to the support assembly 72 and the support assembly 72 is adapted to support the platform 120 so the support surface 122 is disposed in a substantially horizontal plane.

Four circumferentially spaced inclined support surfaces 126 are formed in the upper support surface 122 with each inclined support surface 124 extending a distance angularly upwardly and outwardly from the upper end 96 of the female die 94 at an angle 127 (shown in FIG. 1 with respect to one of the inclined support surfaces 126) and with the remaining portions of the support surface 122 being disposed in a generally horizontal plane. The angle 127 is about the same as the angle 64 of the flared portion 58 of the male die 44 and thus about the same as the angle 117 of the flared portion 112 of the female die 94.

Each inclined support surface 126 is generally triangularly shaped with the base of each triangularly shaped inclined support surface 126 being disposed near the opening in the female die 94 and with each triangularly shaped inclined support surface 126 extending upwardly and terminating with the triangle apex outermost end. The inclined support surfaces 126 are spaced apart at about ninety degree intervals circumferentially about the opening in the female die 94, and the inclined support surfaces 126 are arranged about the female die 94 so the edges of such support surfaces 126 cooperate to form a substantially square shape in a plan view as shown in FIG. 2 with the outermost ends of the inclined support surfaces 126 forming the corners of this square shape.

Each inclined support surface 126 is connected to the platform 120 by a pair of sides 128 and 130, as shown in FIG. 2 with respect to one of the inclined support surfaces 126. Each inclined support surface 126 cooperates with the sides 128 and 130 connected thereto to encompass an enclosed space. A plurality of hold openings 134 are formed through each inclined support surface 126 (only two of the hold openings 134 being designated by reference numerals in FIGS. 1 and 2) and the hold openings 134 in each inclined support surface 126 are in communication with the space enclosed by that inclined support surface 122 cooperating with the sides 128 and 130.

A vacuum source 136 is connected to each of the spaces enclosed by the inclined support surfaces 126 and cooperating sides 128 and 130 and a control valve 138 is interposed between the enclosed spaces and the vacuum source 136, the vacuum source 136 being in communication with the hold openings 134 in the inclined support surfaces 126 in the opened position of the control valve 138. In one (opened) position of the control valve 138, communication is established between the hold openings 134 and the vacuum source 136 and, in one other (closed) position of the control valve 138, communication is interrupted between the hold openings 134 and the vacuum source 136.

Adjacent pairs of inclined support surfaces 126 are spaced a distance apart thereby forming a substantially flat, horizontally disposed flat portion 140 of the support surface 122 which is disposed generally between each pair of adjacent inclined support surfaces 126. Each flat portion 140 extends a distance radially outwardly from the opening in the female die 94. The flat portions 140 cooperate with the inclined support surfaces 126 to form the support surface 122.

A plurality of spaced apart ribs 142 are connected to the support surface 122 with some of the ribs 142 being disposed in each flat portion 140. Each rib 142 has an arc-shaped cross section with a rounded uppermost end portion and each rib 142 extending a distance radially outwardly from the opening in the female die 94, the ribs 142 in each flat portion 140 being spaced distances apart.

In operation, the sheet of material 12 is placed on the support surface 122 of the platform 120 with a central portion of the sheet of material 12 being disposed generally over the opening in the female die 94. As mentioned before, the sheet of material 12 preferably is square-shaped and, in this instance, each corner of the square-shaped sheet of material 12 is placed near the apex of one of the inclined support surfaces 122, each portion of the sheet of material 12 disposed adjacent the corner being disposed generally over the inclined support surface 126. In this position, the sheet of material 12 is disposed on the support surface 122 generally between the male die 44 and the female die 94.

Initially, the hydraulic cylinder 66 supports the male die 44 in the storage position disposed a distance above and generally over the female die 94. The control valve 84 is positioned to connect the openings 76 in the male die 44 to the vacuum source 80 and the control valve 138 is positioned to connect the hold openings 134 in the inclined support surfaces 126 to the vacuum source 136. The heating elements 96 in the male die 44 and the heating elements 118 in the female die 94 each are connected to the electrical power supply 92 so the heating elements 96 cooperate to heat the male die surface 50 to the predetermined temperature level and the heating elements 118 in the female die 94 cooperate to heat the female die surface 100 to the predetermined temperature level.

Since the hold openings 134 in the inclined support surfaces 122 are in communication with the vacuum source 136, the portions of the sheet of material 12 generally near each of the corners of the object of material 12 are biased or pulled generally toward the respective inclined support surfaces 126 when the sheet of material 12 initially is placed or positioned on the upper support surface 122. The amount of vacuum applied through the hold openings 134 is relatively slight so the vacuum tends to bias or pull the portions of the sheet of material 12 generally near the corners toward the respective inclined support surfaces 126, yet the vacuum is small enough to permit the corner portions of the sheet of material 12 to be pulled across the respective inclined support surfaces 126 toward the opening in the female die 94 during the forming of the decorative flower pot cover 14.

After the sheet of material has been positioned on the support surface 122 in the manner described before, the control valve 88 is positioned to connect the upper end of the hydraulic cylinder 66 to the air supply 86 for moving the male die 44 in the downward direction 68 toward the female die 94. As the male die moves in the downward direction 68, the male die 44 moves to a position wherein the lower end 48 of the male die 44 (the lower end 56 of the base portion 52) initially engages the portion of the sheet of material 12 disposed over the opening in the female die 94. Since the openings 76 in the male die 44 are connected to the vacuum source 80, the vacuum applied through the openings 76 in the male die 44 biases the engaged portion of the sheet of material 12 contacted by the lower end 48 of the male die 44 into engagement with the lower end 48 of the male die 44, such vacuum holding the engaged portion of the sheet of material 12 generally against the lower end 48 of the male die 44 during the forming of the decorative flower pot cover 14.

The hydraulic cylinder 66 continues to move the male die in the downward direction 68 pushing portions of the sheet of material 12 generally into the opening in the female die 94 forming the female die surface 100, the holding of the engaged portion of the sheet of material 12 against the lower end 48 of the male die 44 substantially preventing the slipping of the sheet of material 12 as the sheet of material 12 is moved by the male die 44 into the opening forming the female die surface 100. The male die 44 continues to be moved in the downward direction into the opening forming the female die surface 100 to a position wherein the male die surface 50 is matingly disposed within the female die surface 100 with the lower end 44 of the male die 44 being disposed generally near the lower end 104 of the female die surface 100, portions of the sheet of material 12 being disposed generally about the male die surface 50 and generally between the male die surface 50 and the female die surface 100 in the forming position of the male die 44 within the female die surface 100.

The vacuum applied through the hold openings 134 in the inclined support surfaces 126, permits the portions of the sheet of material 12 disposed generally over the inclined support surfaces 126 to be biased toward such inclined support surfaces 126 and yet to be slidingly moved in the direction generally toward the opening in the female die 94 forming the female die surface 100 as the male die 44 engages the sheet of material 12 and pushes the sheet of material 12 into the opening forming the female die surface 100 as the male die 44 is moved to the forming position. In the forming position of the male die 44, the vacuum applied through the hold openings 134 in the inclined support surfaces 126 cooperate to hold the four courner portions of the sheet of material 12 generally against the respective inclined support surfaces 126 during the forming of the decorative cover 14 with portions of the sheet of material 12 being disposed generally over the ribs 142 on each of the flat portions 140 of the support surface 122.

In the forming position of the male die 44 within the opening forming the female die surface 100, the base portion 106 of the female die 94 cooperates with the base portion 52 of the male die 44 to form the portion of the sheet of material disposed therebetween into the base 26 of the decorative flower pot cover 14. The flared portion 112 of the female die 94 cooperates with the flared portion 58 of the male die 44 to form the portion of the sheet of material 12 disposed therebetween into the lower portion of the decorative border 34 generally adjacent the upper end 28 of the base 26, thereby establishing or forming the angle at which the decorative border 34 extends upwardly and outwardly from the opened upper end 28 of the base 26. The four flared petal-like portions 36 of the decorative border 34 are disposed on the respective inclined support surfaces 126 during the forming of the decorative cover 14. The vacuum applied at the hold openings 142 biases the four corner portions of the sheet of material 12 against the respective inclined support surfaces 126 which tends to pull or hold the four corner portions from being pushed into the opening in the female die 94, although the vacuum is slight which permits the four corner portions of the sheet of material 12 to slide over the inclined support surfaces 12 toward the opening in the female die 94 during the forming process. This action on the four corner portions of the sheet of material 12 tends to keep overlapping portions or overlapping folds from forming in the petal-like portions 36 of the formed decorative flower pot cover 14. The ribs 142 in the flat portions 140 of the support surface 122 tend to form elongated outwardly extending waves or non-bonding loose overlaps or folds in the flare connecting portions 40 of the formed decorative flower pot cover 14. The waves or loose non-bonding overlaps or folds tend to pull portions of the material toward the flat portions 140 and generally away from the inclined support surfaces 122 which contributes to maintaining the four corner portions of the sheet of material 12 forming the petal-like portions 36 substantially flat and free of folds.

In a preferred form, the control valve 88 includes a timer which is constructed and adapted to keep the air supply 86 connected to the hydraulic cylinder 66 for holding the male die 44 in the forming position with respect to the female die 94 for a predetermined period of time which, in one embodiment, is about three seconds, for example, the particular time being sufficient to form the decorative flower pot cover 14 and to permit the bonding of the overlapping folds 42. At the end of this predetermined period of time, the control valve 88 is moved to connect the air supply 86 to the lower end of the hydraulic cylinder 66, thereby causing the male die 44 to be moved in the upward direction 70 to the storage position. As the male die 44 is moved in the upward direction 70 to the storage position, the vacuum applied through the openings 76 in the male die 44 holds the formed cover against the male die surface 50 or, more particularly, holds the closed lower end 30 of the formed decorative cover 14 against the lower end 48 of the male die 44. When the male die 44 has been moved to the storage position, the control valve 84 is positioned to connect the blower 82 to the openings 76 in the male die 44 thereby releasing the formed cover from the male die surface 50 so the formed decorative flower pot cover 14 easily can be removed or released from the male die 44 for conditioning the cover forming system 10 to form another decorative flower pot cover 14.

The surface area of the portions of the sheet of material 12 which is pushed into the base portion 106 of the female die 94 and which is utilized to form the base 26 of the decorative flower pot cover 14 exceeds the surface area of either the base portion 52 of the male die surface 50 or the base portion 106 of the female die surface 100 or the outer peripheral surface including the bottom of the flower pot object 16. This excess material utilized to form the base 26 during the forming process is utilized to form the overlapping folds 42.

It should be noted that, in one embodiment, the vacuum source 136 actually is a blower which is connected to the conduit in such a manner as to impose a slight vacuum through the hold openings 142. Also, it should be noted that, in one embodiment, the system 10 does not include the blower 82 and, in this embodiment, the valve 84 is positioned to disconnect the vacuum source 80 from the openings 76 in the male die 44 when the male die 44 is moved to the storage position. In this embodiment, the formed decorative flower pot cover 14 is released from the male die 44 by the weight of the formed decorative flower pot cover 14, the formed decorative flower pot cover 14 simply falling off the male die 44. Further, the vacuum source 80 also may be a blower which is connected to the conduit 78 in such a manner as to impress a vacuum at the openings 76.

It should be noted that, in some applications, the flower pot cover 14 may be formed without using the vacuum source 80 applied at the openings 76 in the male die 44. However, it has been found that the friction between the male die surface 50 and the engaged portions of the sheet of material 12 varies thereby causing the male die 44 to push the sheet of material 12 into the female die surface 100 in an uneven manner. This difference in friction also may result from using different materials to form the sheet of material 12. In any event, the vacuum applied through the openings 76 holds the engaged portion of the sheet of material 12 against the bottom or lower end 48 of the male die 44 so the male die 44 pushes the engaged sheet of material 12 evenly into the female die surface 100 which contributes to the forming of the decorative border 34 having a substantially square appearance in a plan view as shown in FIG. 3B.

In some applications, it has been found to be desirable to form an opening in the lower end 104 of the female die 94. A pad (not shown) is disposed in such opening and the pad is connected to a hydraulic cylinder (not shown) which is disposed generally below the female die 94. During the operation, the hydraulic cylinder moves the pad up to a position wherein the pad is generally coplanar with the upper end 96 of the female die 94 and the male die 44 then is lowered toward the engaging position after the sheet of material has been positioned on the support surface 122 with a central portion of the sheet of material being disposed generally over the pad. The lower end 48 of the male die 44 initially engages the sheet of material and a portion of the sheet of material is compressed generally between the lower end 48 of the male die 44 and the pad. The male die 44 then further is moved toward the forming position pushing the pad back into the opening in the lower end 104 of the female die 44. Thus, the pad and the lower end 48 of the make die 44 cooperate to hold the sheet of material as the male die 44 and the female die 94 are moved into the forming position.

EMBODIMENT OF FIG. 4

Figure 4:
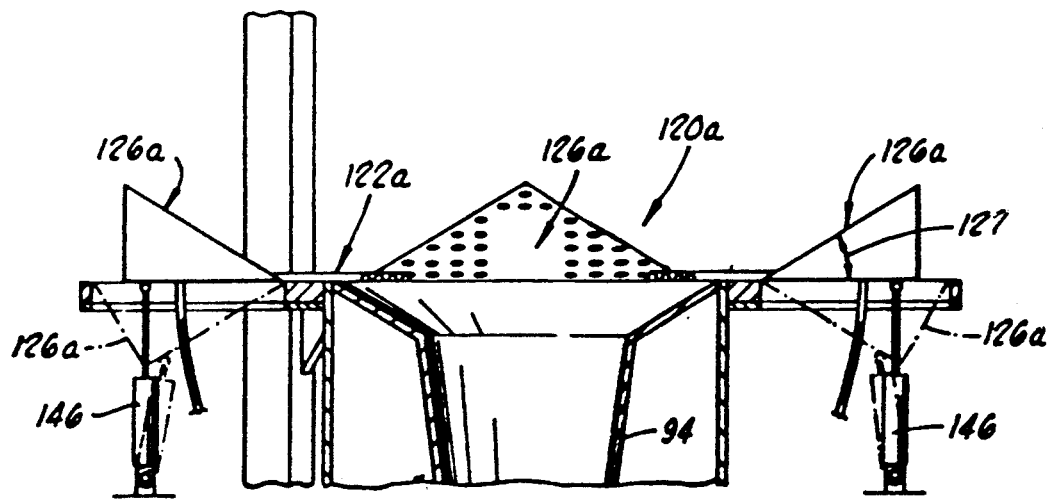
FIG. 4 is a side elevational, partial sectional view of a modified platform which may be used in the article forming system shown in FIGS. 1 and 2 in lieu of the platform shown in FIGS. 1 and 2.

Shown in FIG. 4 is a modified platform 120a which is constructed exactly like the platform 120 shown in FIGS. 1 and 2 and described in detail before, except the modified platform 120a includes modified inclined support surfaces 126a. The base of each inclined support surface 120 is pivotally connected to the platform 120a and each inclined support surface 126a is pivotally moveable from the operating position (shown in solid lines in FIG. 4) wherein each inclined support surface 126a extends angularly upwardly at the angle 127 from the platform 120 to a storage position (shown in dashed lines in FIG. 4) wherein each inclined support surface 126a is disposed in a substantially horizontal plane. The inclined support surfaces 126a each are movable through respective openings in the platform 126 to the storage position and the inclined surfaces 126a are supported generally within one of the openings formed in the platform 126a in the storage position.

The platform 120a includes four hydraulic cylinders 142 and a rod of each of the hydraulic cylinders 146 is connected to one of the inclined support surfaces 126a. The hydraulic cylinders 146 are connected to the air supply 86 (shown in FIG. 1) and a control valve (not shown) is interposed between the air supply 86 and the hydraulic cylinders 146.

In one position, the air supply 86 is connected to the hydraulic cylinders 146 for moving the inclined support surfaces 126a connected thereto in an upward direction to move the inclined support surfaces 126a from a horizontally disposed position to an operating position and, in one other position, the air supply 86 is connected to the hydraulic cylinder 146 for moving the inclined support surfaces 126a connected thereto in the downward direction to move the inclined support surfaces 12a from the operating position to the storage position wherein the inclined support surfaces 126a each are disposed in a substantially horizontal plane.

The modified platform 120a will operate with the remaining portion of the cover forming system 10 to form the decorative flower pot cover 14 in a manner exactly like that described before with respect to the platform 120 (shown in FIGS. 1 and 2), except initially the air supply 86 is connected to the hydraulic cylinders 146 for moving the inclined support surfaces 126a to the storage position wherein each inclined support surface 126a is disposed in a horizontal plane substantially coplanar with the remaining portion of the support surface 120a. In this storage position of the inclined support surfaces 126a, the sheet of material 12 is positioned on the support surface 122a. After the sheet of material 12 has been positioned on the support surface 122a, then the air supply 86 is connected to the hydraulic cylinders 146 for moving the inclined support surfaces 126a connected thereto to the forming position wherein each inclined support surface 126a is angularly disposed with respect to the remaining portions of the support surface 122a. When the inclined support surfaces 126a each have been moved to the forming position, the sheet of material 12a partially supported on the inclined support surfaces 126a then can be formed into the decorative flower pot cover 14 in a manner exactly like that described before with respect to the platform 120 shown in FIGS. 1 and 2. After the decorative flower pot cover 14 has been formed, then the hydraulic cylinders 146 are connected to the air supply 86 for moving the inclinded support surfaces 126a connected thereto in the downward direction until each of the inclined support surfaces 126a is disposed in the storage position extending in a substantially horizontal plane coplanar with the horizontal planar disposition of the remaining portion of the support surface 122a.

The movement of the inclined support surfaces 126a to the storage position wherein each of the inclined support surfaces 126a is disposed in a horizontal plane substantially coplanar with the horizontal planar disposition of the remaining portions of the upper surface 122a provides a substantially flat support surface 122a which may be more convenient for loading the sheet of material 12 onto the support surface 122a and which particularly may be more convenient to accomodate an automatic or semiautomatic loading of the sheet of material 12 onto the support surface 122a during the forming operations.

EMBODIMENT OF FIGS. 5 AND 6

Shown in FIGS. 5 and 6 is another modified system 10c which includes a generally circularly-shaped lower table 200 having an upper surface 202 and a lower surface 204. A shaft 206 is connected to a central portion of the lower surface 204 and the opposite end of the shaft 206 is supported on the floor 74.

Four female dies 94 are disposed in openings (not shown) in the table 200. The female dies 94 are circumferentially spaced at ninety degree intervals about the table 200. The female dies 94 each are constructed exactly like the female dies 94 shown in FIGS. 1 and 2 and described in detail before.

As shown in FIG. 6, the modified system 10c also includes an upper table 212 having an upper surface 214 and a lower surface 216. The shaft 206 extends from the lower table 200 through the upper table 212 and the shaft 206 is connected to a central portion of the upper table 212, the shaft 206 extending a distance above the upper surface 214 of the upper table 212.

A table drive assembly 217 is connected to the shaft 206 and the table drive assembly 217 also is connected to an AC source 218. The table drive assembly 217 is adapted to drivingly rotate the shaft 206 and the upper and the lower tables 212 and 200 in a direction 220 during aspects of the operation of the system 10c. In one form, the table drive assembly 217 includes a motor and means (such as gears or pulley belts, for example) for connecting the output shaft of the motor to the shaft 206 for drivingly rotating the lower and upper tables 200 and 212 in the direction 220. The table drive assembly 208 also includes controls for drivingly rotating the lower and upper tables 200 and 212 and for stopping the rotation of the lower and upper tables 200 and 212 in a manner to be described in greater detail below with respect to the operation of the system 10c. It should be noted that various forms of table drive assemblies which are constructed and adapted to drivingly rotate assemblies like the lower and upper tables 200 and 212 in a particular controlled manner are well known in the art and the system 10c does not contemplate nor is the system 10c limited to any particular type of table drive assembly.

Four support surfaces 122a are formed on the upper surface 202 of the lower table 200 with each of the support surfaces 122a being disposed about one of the female dies 94 in a manner exactly like that described before with respect to the support surfaces 122 and 122a and the female die 94 shown in FIGS. 1, 2 and 4. In the system 10c, the inclined support surfaces 126a formed on each of the support surfaces 122a are constructed exactly like those shown in FIG. 4 and described in detail before; however, the means (hydraulic cylinders 146 and the associated air supply) for moving the inclined support surfaces 126a to the storage and the forming positions is not shown in FIG. 6.

Four male dies 44 are connected to the upper table 212 with the male dies 44 each extending from the lower surface 216 of the upper table 212. The male dies 44 are circumferentially spaced at ninety degree intervals about the lower surface 216 of the upper table 212. The upper table 212 is disposed generally above the upper surface 202 of the lower table 200 with the upper surface 202 of the lower table 200 being spaced a predetermined distance from the lower surface 216 of the upper table 212. Further, the upper table 212 is disposed and positioned and the male dies 44 are disposed and positioned on the upper table 212 so that each of the male dies 44 is operatively aligned with the opening forming the female die surface 100 in one of the female dies 94 supported in the lower table 200.

A vacuum source 221 is connected to the openings 76 (not shown in FIG. 6) in each of the male dies 44 by way of a coupling 222, in the manner and for the reasons described before with respect to the system 10 shown in FIG. 1. The coupling 222 is adapted to provide a means for connecting the vacuum source 221 to the male dies 44 by way of conduits while permitting the rotation of the upper and the lower tables 200 and 221 with tangling or wrapping of conduits about the shaft 206 which would occur if such connections were made with single continuous conduits without the coupling 222. The coupling 222 has one portion which is secured to the shaft 206 for rotation with the shaft 206, this being the portion which is connected to the male dies 44, and the coupling has one portion which is not connected to the shaft 206 and does not rotate with the shaft 206, this being the portion which is connected to the vacuum source 221.

An air supply 224 is connected to each of the hydraulic cylinders 66 by way of a coupling 226, a coupling 228 and a control valve 230. The couplings 226 and 228, like the coupling 222, provide a means for connecting the air supply 224 to the hydraulic cylinders 66 while permitting rotation of the upper and the lower tables 212 and 200 without tangling or wrapping of conduits about the shaft 206 which would occur if such connections were made with single continuous conduits without the couplings 226 and 228. The couplings 226 and 228 each have one portion which is connected to the shaft 206 for rotation with the shaft 206, this being the portion which si connected to the hydraulic cylinders 66 and the couplings 226 and 228 each have another portion which is not connected to the shaft 206 and does not rotate with the shaft 206, this being the portion which is connected to the air supply 224.

The system 10c includes a film supply 232 which is adapted to feed film to be formed into the decorative flower pot covers 14 during the operation of the system 10c. More particularly, the film supply 232 includes a roll of film 234 having a supply of film rolled thereabout. The roll of film 234 is rotatingly supported generally near the lower table 200. The film on the roll of film 234 is passed through a pair of rollers 236 and 238 and at least one of the rollers 236 and 238 is drivingly connected to a motor or other such drive means (not shown), which is adapted to drivingly rotate the roller 236 or 238 connected thereto for drivingly moving the sheet of film between the rollers 236 and 238 thereby unrolling a portion of the film from the roll of film 234 and passing a portion of the film from the rollers 236 and 238 in a direction 240. The rollers 236 and 238 are positioned to drivingly pass a portion of the sheet of film in the direction 240 generally onto a portion of the upper surface 202 of the lower table 200 during the operation of the system 10c.

The system 10c includes a cutting assembly 242 which includes a knife 244 having a portion thereof connected to the rod of a hydraulic cylinder 246. The knife 244 and the hydraulic cylinder 246 each are supported at a predetermined position above the upper surface 202 of the lower table 200 with the knife 244 being positioned to cut the film supplied by the film supply 232 at a predetermined position to dispose a sheet of material 12 on the upper surface 202 of the lower table 200, the sheet of material 12 cut by the cutting assembly 232 more particularly being disposed and supported on one of the support surfaces 122a during the operation of the system 10c.

The system 10c also includes a cover unloading assembly 248 which is adapted to remove the formed decorative covers 14 from the system 10c. The cover unloading assembly 248 includes a motor-gear unloading drive 250 which is operatively connected to a pair of spaced-apart unloading arms 252 and 254, the unloading arms 252 and 254 each extending in a parallel relationship and being spaced a predetermined distance apart. The cover unloading assembly 248 is positioned near and generally between the lower and the upper tables 200 and 212 so that the unloading drive 250 moves the unloading arms 252 and 254 in a direction 256 generally to an unloading position (shown in dashed lines in FIG. 6) and so that the unloading drive 250 moves the unloading arms 252 and 254 in a direction 258 to a loading position during the operation of the cover forming system 10c. The arms 252 and 254 are connected by way of a hinge 255 to the linkage connecting the arms 252 and 254 to the drive 250, and the hinge 255 is constructed to support the arms 252 and 254 in the position shown in FIG. 6 in the locked position of the hinge 255 and to pivotally drop the arms 252 and 254 in the unlocked position to facilitate the removal of the formed cover.

Since the tables 200 and 212 rotate, the positions of the various elements connected to the tables 200 and 202 shift during the operation of the system 10c. During the operation of the system 10c, the tables 200 and 212 repeatable are movable to four positions and for the purpose of describing the operation of the system 10c, the four positions are designated in FIG. 6 by the letters "A", "B", "C" and "D", and sometimes referred to herein as "stations". In general, at station "A", the sheet of material 12 is placed on the support surface 120a and, at station "B", the male die 44 moves into the forming position within the opening in the female die 94 forming the female die surface 100 and, at station "C", the formed decorative flower pot cover 14 is removed from the system 10c and, at station "D", the male die 44 is conditioned to again initiate the forming process.

Initially, the tables 200 and 212 are positioned in fixed relative positions so that one of the female dies 94 along with the support surface 122a associated therewith is operatively positioned with respect to one of the male dies 44, and the tables 200 and 212 are positioned so that one of the female dies 94 and the associated male die 44 is positioned at each of the stations "A", "B", "C" and "D". At station "A", one of the support surfaces 122a is positioned near the film supply 232 for receiving a sheet of material 12 to be formed into the decorative flower pot cover 14.

At station "A", one of the rollers 236 and 238 is drivingly rotated for passing the film of material therebetween and the film of material is drivingly moved in the direction 240 until a predetermined length of film constituting the sheet of material 12 has been disposed or passed onto the support surface 122a. After the predetermined length of film constituting the sheet of material 12 has been passed onto the support surface 122a, the hydraulic cylinder 246 is connected to the air supply for moving the knife 244 in a downward direction toward the upper surface 202 of the lower table 200 and the knife 244 is moved in this direction by the hydraulic cylinder 246 to a position wherein the knife 244 cuttingly engages the portion of the film disposed thereunder to sever a portion of the film from the roll of film 234 thereby leaving a generally square-shaped sheet of material 12 operatively disposed on the support surface 122a above one of the female dies 94 at station "A".

After the sheet of material 12 has been cut from the roll of film 234, the hydraulic cylinder 246 is connected to the air supply for moving the knife 244 from the cutting position to the storage position. After the knife 244 has been moved to the storage position, the table drive assembly 217 is activated to move the lower and the upper tables 200 and 212 to a position wherein the male and female dies 44 and 94 at station "A" are moved in the direction 220 to station "B" and thus the sheet of material 12 which was positioned on the support surface 122a at station "A" is moved to station "B", the other male and female dies 44 and 94 also being moved or advanced in the direction 220. At station "B", the male die 44 is moved into the forming position with the sheet of material 12 by actuating the appropriate hydraulic cylinder 66 with the male die surface 50 being matingly disposed generally within the female die surface 100 with portions of the sheet of material 12 being disposed therebetween in a manner like that described before with respect to the system 10 shown in FIGS. 1 and 2, thereby forming the decorative flower pot cover 14. While the decorative cover 14 is formed at station "B", another sheet of material 12 is cut from the roll of film 234 and operatively disposed on the support surface 122a associated with the female die 94 located at station "A".

After the decorative flower pot cover 14 has been formed at station "B", the tables 200 and 212 are rotatingly moved by the table drive assembly 217 to position the male and female dies 44 and 94 which previously were located at station "B" at station "C", thereby positioning the formed flower pot cover at station "C". At station "C", the male die 44 is moved in the upward direction to the storage position with the vacuum applied via the vacuum source 221 holding the formed decorative flower pot cover 14 on the male die 44 in the manner like that described before with respect to the system 10 shown in FIGS. 1 and 2. At station "C" and after the male die 44 is moved to the storage position, the unloading drive 250 is activated to move the unloading arms 252 and 254 in the direction 258 to the unloading position and, when the unloading arms 252 and 254 have been moved to the unloading position, the vacuum applied by the vacuum source 221 is disconnected from the male die 44 at station "C" thereby releasing the formed decorative flower pot cover 14 from the male die 44. When the formed decorative flower pot cover 14 is released from the male die 44 at station "C", the released cover 14 is disposed with or between the arms 252 and 254 with the decorative border 34 operating to prevent movement of the cover 14 through the space between the arms 252 and 254 so the arms 252 and 254 cooperate to hold the formed decorative flower pot cover 14. In this position of the formed cover 14, the unloading drive 250 is actuated to move the arms 252 and 254 in the direction 256 to the unloading position wherein the formed cover 14 can be removed from the arms 252 and 254 for disposing the formed cover 14 in shipping boxes for disposing the formed cover 14 for further processing. In the unloading position, the arms 252 and 254 can be pivotally dropped by unlocking the hinge 255.

After the formed cover 14 is removed from the male die 44 at station "C", the tables 200 and 212 again are rotated in the direction 220 to position the male and female dies 44 and 94 which were at station "C" at station "D". At station "D", the vacuum is reapplied to the male die 44 located at station "D" and the male and female dies 44 and 94 located at station "D" are conditioned to again form another decorative flower pot cover 14.

The system 10c is constructed to sequentially move the male dies 44 and associated female dies 94 to the stations "A", "B", "C" and "D". The processes just described which occur at each of the respective stations "A", "B", "C" and "D" continuously occur so the system 10c provides a more automated process for forming the decorative flower pot covers 14.

EMBODIMENT OF FIGS. 7A AND 7B

Shown in FIGS. 7A and 7B is a modified system 10b which is constructed and operates exactly like the system 10 shown in FIGS. 1 and 2 and described in detail before, except the system 10b includes a modified support assembly 72b. The support assembly 72b includes a post 150 having one end supported on the floor 74 and extending a distance upwardly therefrom terminating with an upper end portion. One end of a beam 154 is pivotally connected to the upper end portion of the post 150. The male die 44 is supported on the end portions of the beam 154, generally opposite the end which is pivotally connected to the post 150.

A rod is reciprocatingly disposed in a hydraulic cylinder 156 and the rod is connected to the beam 154. The hydraulic cylinder 156 is connected to the air supply 86 (shown in FIG. 1) and a control valve (not shown) is interposed between the air supply 86 and the hydraulic cylinder 156 for controlling the operation of the hydraulic cylinder 156. In one position, the air supply 86 is connected to the upper end of the hydraulic cylinder 156 for pivotally moving the beam 154 in the direction 160 and, in one other position, the hydraulic cylinder 156 is connected to the control valve 158 for pivotally moving the beam 154 in the direction 162.

The modified system 10b will operate to form the decorative flower pot cover 14 in a manner exactly like that described before with respect to the system 10 shown in FIGS. 1 and 2, except the air supply 86 initially is connected to the hydraulic cylinder 156 for moving the beam in the direction 162 to the forming position wherein the male die surface 50 is supported a distance above and generally over the female die surface 100. In this position of the beam 154, the system 10b is operated exactly like the system 10a to form the decorative flower pot cover.

After the decorative flower pot cover 14 has been formed and the male die 44 moved to the storage position with the vacuum still applied through the openings 76 and the male die 44 operating to hold the closed lower end 30 of the decorative cover 14 generally against the lower end 48 of the male die 44, the hydraulic cylinder 156 is connected to the air supply 86 for moving the beam 154 in the direction 160 to the cover disposing position. When the beam 154 has been moved to the cover disposing position, then the control valve 88 is positioned to connect the openings 76 to the blower 82 for releasing the engagement between the formed decorative flower pot cover 14 and the male die 44 for removing the formed decorative flower pot cover 14 from the male die 44. The movement of the beam 154 to the cover disposing position permits the formed decorative flower pot cover 14 to be moved to a different position with respect to the forming position which may be more convenient in some applications for releasing the formed decorative flower pot cover 14 more directly into subsequent process steps such as boxing for shipment, for example.

The following are examples of techniques for making decorative covers 14 in accordance with the present invention.

In one example, a sheet 0.83 gauge polypropylene is acrylic coated on both surfaces, one surface coating being tinted with color and the opposite surface being opaque in some instances and being clear in some other instances (particularly preferable when the other surface is clear or tinted yellow, for example). A clear polypropylene sheet is interleaved with the tinted or colored sheet of material, this sheet being acrylic coated on both surfaces. The two sheets then are bonded together to form the sheet of material 12. The coloring inks may be acrylic, heat sealable as described above or may be modified nitrocellulose heat sealable.

In another example, a 1.32 gauge polypropylene sheet is acrylic coated on both surfaces, one surface coating being tinted with color and the opposite surface coating being opaque colored in some instances and left clear in some other instances (particularly preferable when the opposite surface is tinted white or yellow). This sheet then is laminated and adhered to a second sheet of Saran coated polypropylene or uncoated polypropylene material using the acrylic heat sealing inks or the modified nitrocellulose inks as the adhesive mentioned before.

In another example, a sheet of Saran coated polypropylene or uncoated polypropylene of material is tinted on one surface with a color and on the opposite surface of the same sheet opaque colored in some instances or clear in some other instances (particularly preferable when tinted white or yellow). A second sheet of clear polypropylene acrylic coated material is adhered to the first sheet. Various inks (coloring) are added to the acrylic adhesive or the modified nitrocellulose adhesive, both heat sealable.

In another example, a Saran coated polypropylene or uncoated polypropylene is tinted on one surface with a chosen color using a pressure sensitive rubber based adhesive colored as the opaque surface. This first sheet then is adhered to a second clear sheet of Saran coated or uncoated polypropylene.

In another example, a first sheet of uncoated polypropylene is tinted with a color on one surface with the opposite surface being opaque coloring or, in some instances, left clear, particularly when the opposite surface is tinted or colored white or yellow. A second Saran coated polypropylene sheet is adhered to this first sheet. Inks are added to the acrylic or modified nitrocellulose adhesive for coloring, both adhesives being heat sealable.

In another example, a first sheet of polypropylene film is adhesively connected to a paper laminate with the appropriate coloring and metal finishes to provide a sheet of material 12 having an overall appearance similar to aluminum foil, for example, and which has deadfold characteristics or properties.

In another example, a foil sheet is adhesively connected to an uncoated polypropylene sheet with an interleaved third polypropylene sheet which is adhesively coated (heat sealing adhesive) on both surfaces. In some instances the foil is prepainted and, in some instances the three layer sheet of material 12 is embossed with a predetermined pattern.

In another example, a single foil sheet may be utilized to form the article with an adhesive applied to one or both surfaces thereof and, in some applications, the adhesive coating may be eliminated since the foil has dead fold characteristics or, in other words, since the foil is shape sustaining.

In another example, the sheet of material is formed with a first polypropylene sheet layered on a second polypropylene sheet, the first sheet may be adhesively coated on one or both surfaces and the second sheet may be adhesively coated on one or both surfaces. For example, the first sheet may be adhesively coated on both surfaces and the second sheet may be adhesively coated on one surface, opposite the surface disposed adjacent the first sheet so the sheet of material 12 comprises the first and second sheets with an adhesive coating on the opposite surfaces of the sheet of material 12. In this last mentioned example, the second sheet may not be coated so only the coating on the one surface of the first sheet is exposed in the finished sheet of material 12 or the coatings may be reversed with respect to the first and the second sheets so only the adhesive coating on the second sheet is exposed on the finished sheet of material. In this example, the first and second sheets may be adhesively connected to form the sheet of material 12 prior to forming the decorative cover 14 or the first and second sheets may be layered and adhesively connected furing the forming of the decorative cover 14.

The polypropylene sheet or film is relatively thin having a thickness in a range from about 1.0 mills to about 1.5 mills and, thus, a sheet of material 12 formed by layering and adhesively connecting a first and a second sheet of polypropylene sheets or films has a total thickness in a range from about 2.0 mills to about 3.0 mills. The thickness of a sheet of polypropylene film varies and, in addition, the thickness will vary depending on the thickness of the adhesive coating applied to the sheets to be utilized in making the sheet of material 12.

In addition to being relatively thin, the polypropylene sheet does not have any substantial dead fold characteristics or, in other words, shape sustaining characteristics. Thus, when this type of material is formed into any particular shape, such as the decorative cover 14, the formed sheet of material tends to return to the unformed state when constraints are removed. In addition, the strength of the polypropylene sheet is not sufficient to sustain the formed shape which combines with the lack of dead fold characteristics to render it extremely difficult to utilize this material in making preformed articles or covers.

In another example, a first sheet of polypropylene film has a transparent color printed on one surface thereof and a metallic ink is applied to one surface of a second sheet of polypropylene film. The color and the metallic ink may be incorporated with the adhesive coating if the adhesive coating is to be applied to that surface of the sheet. The first sheet with the transparent color forms the outer or lower surface 43 of the cover 14 and the second sheet with the metallic ink forms the inner or upper surface 41 of the cover 14, the combination of the transparent color along with the metallic ink or finish provides a finished, preformed article formed of a sheet of material 12 comprising two polypropylene films, but also having an overall metallic appearance. In lieu of metallic inks, the metallic finish can be applied to the film by metalizing one surface of the film or by adhesively connecting a film to a foil, for example.

The present invention provides a means for forming an article, a sheet of material 12 formed using one sheet of polypropylene material or two or three layered and adhesively connected sheets of polypropylene material. The overlapping folds 42 which extend various distances and at various angles over or about the formed article provide the strength required for the formed sheet of material 12 to sustain the formed shape. The overlapping folds 42 formed in this manner provide a uniform resistance and a uniform flexibility and give the formed portion of the sheet of material 12 the greatest overall strength per unit mass, the random forming of the overlapping folds 42 providing a close approximation to a uniform thickening-like action thereby allowing thin, non-shape sustaining sheets or films to be utilized in forming articles while resulting in a substantial shape sustaining, relatively thin, article.

The particular films mentioned before were constructed of a polypropylene film. However, such films also could be polyvinyl chloride films which have the advantage of being inherently heat sealable with respect to like materials.

The sealing of one film to another or the sealing of the overlapping folds 42 also can be accomplished utilizing a heat sealable lacquer, a pressure sensitive adhesive which may or may not also require heat, a heat sealable adhesive described before, a hot melt adhesive, wax, solvent, a light activated adhesive or other means of chemically connecting two sheets. The adhesive material can be applied to the sheets by gravure, flexographic, letter press, spray or other means for applying adhesive to films.

The films utilized to form the sheet of material 12, described before, are substantially waterproof so the preformed article also is waterproof. Also, these films have the ability of being flame retarded.

When decorative flower pot covers 14 are formed in accordance with the present invention, as shown in FIGS. 3A and 3B, the preformed covers 14 may be flattened for shipping and storage purposes and the covers 14 then may be unflattened for display or sale or both. The decorative flower pot covers 14 formed in accordance with the present invention easily are unflattened to assume the original preformed shape without any substantial loss of the preformed shape, thereby providing a flexible, yet shape sustaining article. The flattened covers 14 occupy about one-third of the space as compared with stacked covers 14 which reduces shipping costs and storage space.

After the decorative flower pot cover 14 (shown in FIGS. 3A and 3B) is formed, the decorative border 34 is formed by trimming the edges to the desired shape, the decorative flower pot cover 14 shown in FIGS. 3A and 3B being trimmed to a square shape. The particular shape depends on the effect desired and the shape may be round, scalloped or heart shaped, for example. Also, the border 34 may be trimmed in a round shape by cutting the border 34 in the round shape generally near the upper end 28 of the base 26 and, in this embodiment, the cover 14 may be used as a flower pot cover or a hat, such as a St. Patrick's Day hat, for example, with appropriate decorative effects added. The trimming of the border preferably is accomplished utilizing a wire formed in the desired shape which is connected to an electrical supply for heating the wire. The formed cover 14 then can be passed through the opening formed by the wire with the heated wire contacting the border 34 and effecting the desired cut or, in the alternative, the heated wire can be passed over the cover 14 to contact the border 34 at the appropriate position to effect the desired cut.

Changes may be made in the various elements, components, parts and assemblies described herein or in the steps or sequence of steps in the methods described herein without departing from the spirit and scope of the invention as defined in the following claims.

What is claimed is:

1. An apparatus for forming a sheet of material into a flower pot or flower pot cover, comprising:

a male die having an upper end, a lower end and an outer peripheral male die surface extending a distance generally between the lower end and the upper end of the male die;

a female die having an upper end, a lower end and an opening intersecting the upper end and extending a distance toward the lower end forming an inner peripheral female die surface, the opening being shaped to receive the portion of the male die having the male die surface formed thereon and the female die surface being mateable with the male die surface with a clearance therebetween in a forming position of the male die and the female die and the male die being disposed a distance above the female die in a storage position of the male die and the female die;

means for automatically positioning the sheet of material between the male die and the female die when the male die and the female die are positioned in the storage position;

means for moving one of the male die and the female die to the forming position after the sheet of material has been positioned between the male die and the female die for forming the flower pot or flower pot cover, and for removing one of the male die and the female die from the forming position and moving the one of the male die and the female die to the storage position after the flower pot or flower pot cover has been formed;

a platform having a support surface formed thereon and an opening extending through the support surface, the female die being disposed in the opening with the upper end of the female die being disposed generally near the support surface, the support surface being adapted to support at least portions of the sheet of material with a generally central portion of the sheet of material being disposed generally over the opening through the upper end of the female die; and means for holding predetermined portions of the sheet of material during the forming of the flower pot or flower pot cover as the male die and the female die are moved into the forming position while permitting such held portions to slide on the support surface, said means comprising:

a plurality of hold openings formed through the support surface and the hold openings being positioned on the support surface in predetermined positions, and a vacuum source connectable to the hold openings in the support surface for creating a vacuum at the hold openings when connected to the hold openings, the vacuum being sufficient to hold portions of the sheet of material disposed over the hold openings while permitting the held portions of the sheet of material to slide on the support surface during the forming of the flower pot or flower pot cover.

2. The apparatus of claim 1 wherein the hold openings are positioned in four groups of hold openings with the four groups of hold openings being spaced generally at ninety degree intervals generally about the opening at the upper end of the female die and each group of hold openings being spaced a distance from generally adjacent groups of hold openings.

3. The apparatus of claim 1 further comprising:
means for moving one of the male die and the female die from the storage position to an unloading position for unloading the formed flower pot or flower pot cover.

4. The apparatus of claim 1 further comprising:
means for holding the formed flower pot or flower pot cover on the male die as the male die and the female die are moved to the storage position and after the forming of the flower pot or flower pot cover; and means for moving the male die and the formed flower pot or flower pot cover to an unloading position after the forming of the flower pot or flower pot cover for unloading the formed flower pot or flower pot cover.

* * * * *

UNITED STATES PATENT AND TRADEMARK OFFICE
CERTIFICATE OF CORRECTION

PATENT NO. : 5,208,027
DATED : May 4, 1993
INVENTOR(S) : Weder, et al

It is certified that error appears in the above-indentified patent and that said Letters Patent is hereby corrected as shown below:

Column 4, lines 46 and 68, "42" should be --43--.

Column 15, line 68, "si" should be --is --.

Column 20, line 61, "furing" should be --during--.

Signed and Sealed this

Twenty-seventh Day of September, 1994

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,208,027
DATED : May 4, 1993
INVENTOR(S) : Weder, et al.

It is certified that error appears in the above-identified patent and that said Letters Patent is hereby corrected as shown below:

Column 2, line 38, please delete "mills", and substitute therefor --mils--.

Column 2, line 49, please delete "mills", and substitute therefor --mils--.

Column 3, lines 2 and 3, please delete "flower pot", a substitute therefor --flower pots--.

Column 4, line 30, please delete "lower surface 42", and substitute therefor --lower surface 43--.

Column 4, line 32, please delete "lower surface 42", and substitute therefor --lower surface 43--.

Column 6, line 1, after "coating", please delete "the".

Column 7, line 29, please delete "upward direction 68", and substitute therefor --upward direction 70--.

Column 7, line 30, please delete "upward direction 68", and substitute therefor --upward direction 70--.

UNITED STATES PATENT AND TRADEMARK OFFICE
CERTIFICATE OF CORRECTION

PATENT NO. : 5,208,027

DATED : May 4, 1993

INVENTOR(S) : Weder, et al.

It is certified that error appears in the above-identified patent and that said Letters Patent is hereby corrected as shown below:

Column 8, line 51, please delete "inclined support surface 124", and substitute therefor --inclined support surface 126--.

Column 9, lines 18 and 19, please delete "inclined support surface 122", and substitute therefor --inclined support surface 126--.

Column 9, line 58, please delete "inclined support surfaces 122", and substitute therefor --inclined support surfaces 126--.

Column 10, line 3, please delete "heating elements 96" and substitute therefor --heating elements 90--.

Column 10, lines 5 and 6, please delete "heating elements 96", and substitute therefor --heating elements 90--.

Column 10, lines 11 and 12, please delete "inclined support surfaces 122", and substitute therefor --inclined support surfaces 126--.

Column 10, line 62, please delete "lower end 44" and substitute therefor --lower end 48--.

Column 11, line 14, please delete "courner", and substitute therefor --corner--.

Column 11, line 37, please delete "hold openings 142" and substitute therefor --hold openings 134--.

UNITED STATES PATENT AND TRADEMARK OFFICE
CERTIFICATE OF CORRECTION

PATENT NO. : 5,208,027

DATED : May 4, 1993

INVENTOR(S) : Weder, et al.

Page 3 of 5

It is certified that error appears in the above-identified patent and that said Letters Patent is hereby corrected as shown below:

Column 11, lines 43 and 44, please delete "inclined support surfaces 12", and substitute therefor -- inclined support surfaces 126--.

Column 11, line 56, please delete "inclined support surfaces 122", and substitute therefor --inclined support surfaces 126--.

Column 12, line 32, please delete "hold openings 142" and substitute therefor --hold openings 134--.

Column 13, line 14, please delete "make", and substitute therefor --male--.

Column 13, lines 23 and 24, please delete "inclined support surface 120", and substitute therefor --inclined support surface 126a--.

Column 13, line 29, please delete "platform 120", and substitute therefor --platform 120a--.

Column 13, line 33, please delete "platform 126", and substitute therefor --platform 120a--.

Column 13, line 36, please delete "platform 126a", and substitute therefor --platform 120a--.

Column 13, lines 37 and 38, please delete "hydraulic cylinders 142", and substitute therefor --hydraulic cylinders 146--.

UNITED STATES PATENT AND TRADEMARK OFFICE
CERTIFICATE OF CORRECTION

PATENT NO. : 5,208,027

DATED : May 4, 1993

INVENTOR(S) : Weder, et al.

It is certified that error appears in the above-identified patent and that said Letters Patent is hereby corrected as shown below:

Column 13, line 52, please delete "inclined support surfaces 12a", and substitute therefor --inclined support surfaces 126a--.

Column 13, lines 65 and 66, please delete "support surface 120a", and substitute therefor --support surface 122a--.

Column 14, line 15, please delete "inclinded", and substitute therefor --inclined--.

Column 14, lines 65 and 66, please delete "table drive assembly 208", and substitute therefor --table drive assembly 217--.

Column 15, line 36, after "female die surface", please delete "100".

Column 15, line 45, please delete "upper and the lower tables 200 and 221", and substitute therefor --upper and the lower tables 212 and 200--.

Column 16, line 35, please delete "cutting assembly 232", and substitute therefor --cutting assembly 242--.

Column 16, lines 62 and 63, please delete "tables 200 and 202", and substitute therefor --tables 200 and 212--.

UNITED STATES PATENT AND TRADEMARK OFFICE
CERTIFICATE OF CORRECTION

PATENT NO. : 5,208,027
DATED : May 4, 1993
INVENTOR(S) : Weder, et al.

It is certified that error appears in the above-identified patent and that said Letters Patent is hereby corrected as shown below:

Column 17, line 2, please delete "support surface 120a", and substitute therefor --support surface 122a--.

Column 19, line 65, after "polypropylene", please delete "of".

Column 20, lines 64 and 65, please delete "1.0 mills to about 1.5 mills", and substitute therefor --1.0 mils to about 1.5 mils--.

Column 20, line 68, and Column 21, line 1, please delete "2.0 mills to about 3.0 mills", and substitute therefor --2.0 mils to about 3.0 mils--.

Signed and Sealed this

Eighteenth Day of June, 1996

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,208,027
DATED : May 4, 1993
INVENTOR(S) : Donald E. Weder et al.

It is certified that error appears in the above-identified patent and that said Letters Patent is hereby corrected as shown below:

Title page, in the list of Inventors, add --Herbert A. Weder, of Highland, Ill.--

Signed and Sealed this

Ninth Day of May, 2000

Attest:

Q. TODD DICKINSON

*Attesting Officer*    *Director of Patents and Trademarks*